Jan. 2, 1962  R. J. GROSS  3,015,463
ROCKET PROBE DEVICE
Filed April 13, 1960  3 Sheets-Sheet 1
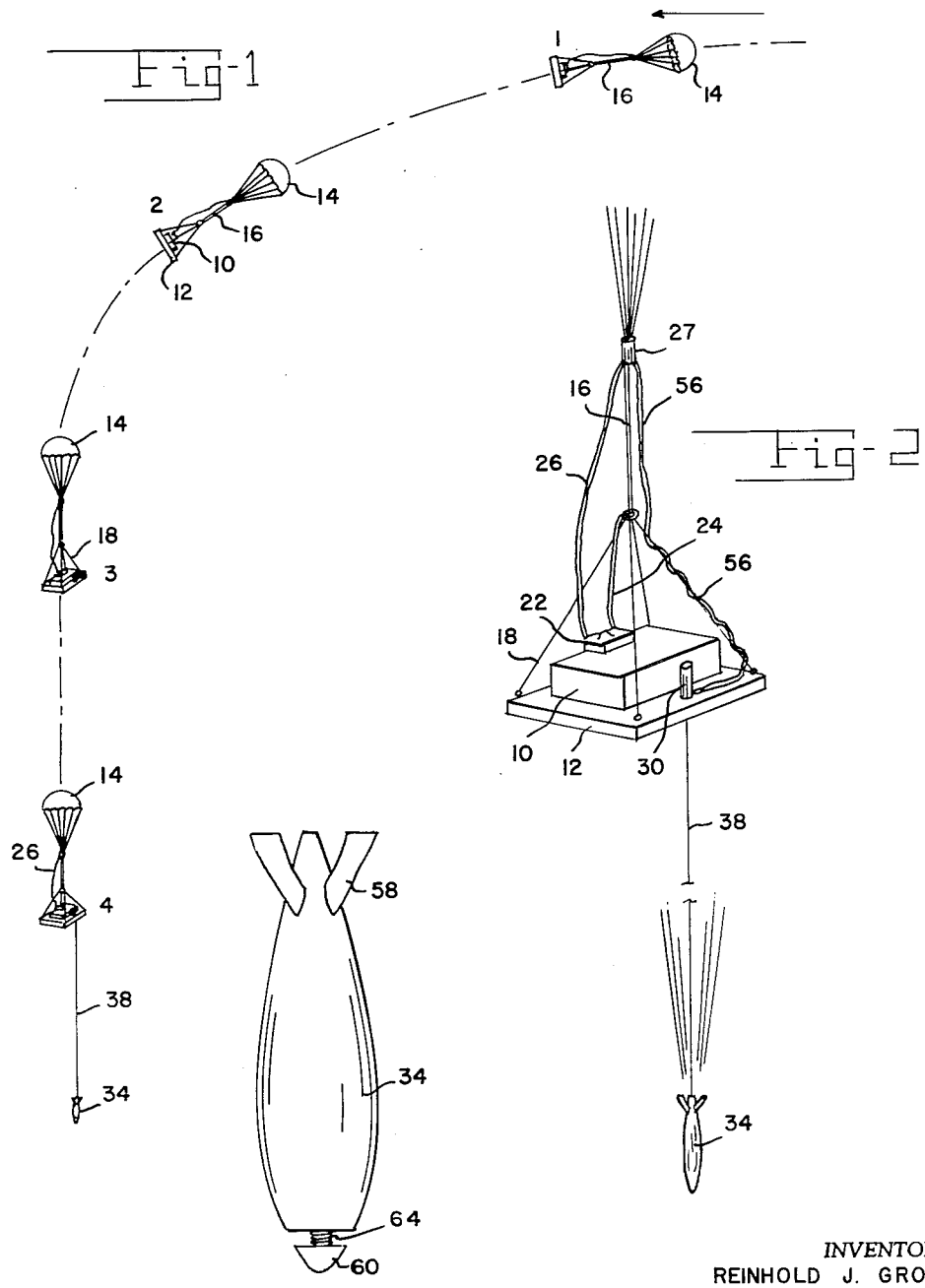
INVENTOR.
REINHOLD J. GROSS
BY
ATTORNEYS Jan. 2, 1962  R. J. GROSS  3,015,463
ROCKET PROBE DEVICE
Filed April 13, 1960  3 Sheets-Sheet 2
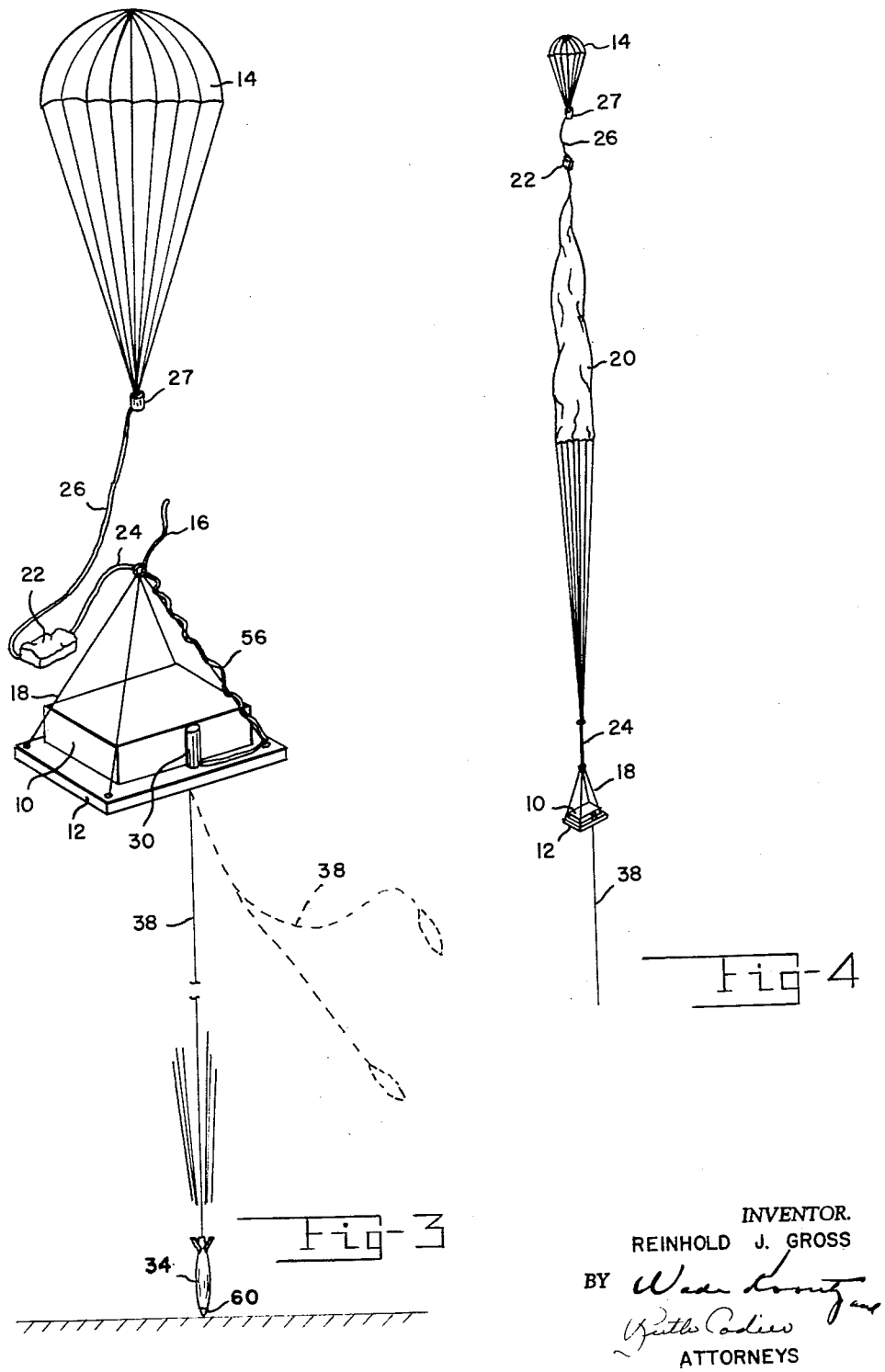
INVENTOR.
REINHOLD J. GROSS
BY
ATTORNEYS Jan. 2, 1962  R. J. GROSS  3,015,463
ROCKET PROBE DEVICE
Filed April 13, 1960  3 Sheets-Sheet 3
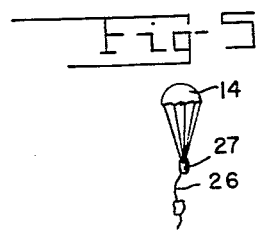
Fig-5
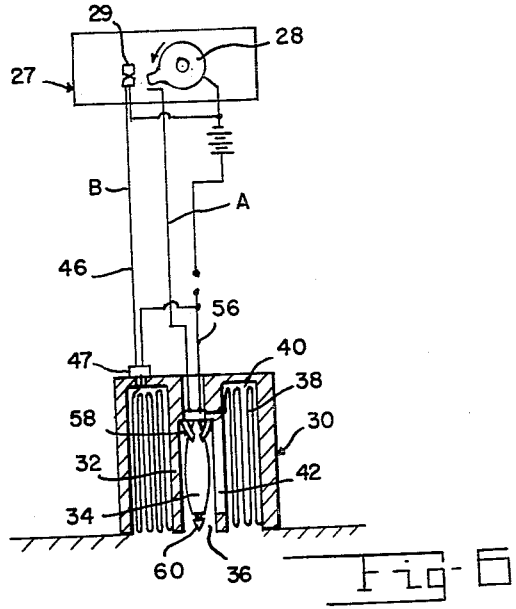
Fig-6
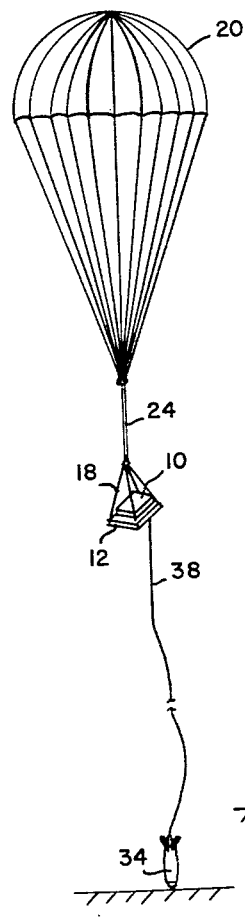
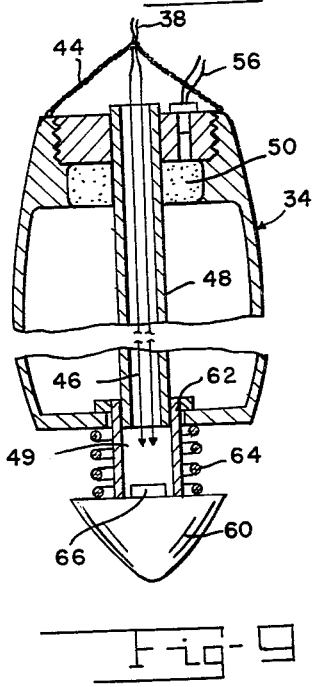
Fig-9
Fig-8
INVENTOR.
REINHOLD J. GROSS
BY
ATTORNEYS United States Patent Office 3,015,463
Patented Jan. 2, 1962

3,015,463
ROCKET PROBE DEVICE
Reinhold J. Gross, 1753 Hearthstone Drive, Dayton, Ohio
Filed Apr. 13, 1960, Ser. No. 22,067
7 Claims. (Cl. 244—147)
(Granted under Title 35, U.S. Code (1952), sec. 266)

The invention described herein may be manufactured and used by or for the United States Government for governmental purposes without payment to me of any royalty thereon.

This invention relates to ground probes used in connection with parachute delivery of cargo and equipment from high altitudes and, more particularly, to a rocket propelled probe device. Much experimentation has been conducted with ground contact sensitive devices. Generally, the purpose of the ground probe is to provide some kind of action at a certain fixed distance above ground to decelerate the rate of descent of an object falling behind the probe, allowing a fast rate of fall from the time the cargo leaves the aircraft until it reaches a predetermined distance, for example, 1,000 feet or so above the ground, and at that point, to cause deployment of a parachute so that the load may then descend at a decreased rate and deliver the cargo to ground at a sufficiently low rate to avoid damage. The probe is usually attached to the cargo by a 1,000 foot cable. At a certain distance above the ground the probe is released, for example, by a timing and/or altimeter device and, when the probe contacts the ground, a main parachute is released so that the remaining portion of the fall of the load is dampened to avoid injury and damage to the cargo. Opening of the main parachute immediately reduces the velocity of the cargo to a value sufficiently low to prevent damage when the cargo strikes the ground. In the usual operation of probes of this kind, the probe itself is simply a weight dropped from the cargo on a long cable which carries electrical conductors and which has a switch which is actuated by ground contact to close a circuit, thereby activating a means for deploying a parachute.

The difficulties experienced with devices of this kind have been manifold. The probe itself failed to stay ahead of the cargo. Wind and air resistances are two of the factors which are instrumental in causing the probe to fall off to the side or even trail behind the cargo making it useless for the probe's intended use. Such a condition is shown in dotted lines in FIG. 3.

Ground sensitive radar type proximity fuzes have also been applied but have not proved practical due to maintenance and other problems. The present invention seeks to avoid these difficulties. The probe itself is provided with rocket propulsion so that the probe is directed straight downwardly and always strikes the ground ahead of the cargo. The rocket probe is carried by the load or cargo at the time it leaves the aircraft, and descends with it either in free fall or in fall dampened by a stabilizer or pilot parachute. At a predetermined time after release of the load from the aircraft, or at a predetermined altitude, an explosive charge is detonated, releasing the probe, and firing the rocket, which descends groundward under its own rocket propulsion.

Other objects and advantages of this invention will appear as the description proceeds.

In the drawing:
FIGS. 1–5 inclusive show successive stages in the process of load descent.

FIG. 1 shows the load in its successive stages of descent from the time it is released from an aircraft and a pilot parachute has been deployed to the stage where the timer has ignited the fuse and the rocket has been ejected downwardly.

FIG. 2 is a view on a larger scale of the load after the rocket has been ejected.

FIG. 3 is a view of the device at the instant the probe strikes the ground and showing the main connection between the load and the pilot parachute in severed condition. The present state of the art is shown in dotted lines.

FIG. 4 shows the main parachute partially deployed.
FIG. 5 shows the main parachute in completely deployed condition with the stabilizer parachute severed from it.

FIG. 6 is a schematic vertical cross sectional view of the rocket probe carrying member, and a schematic view of the wiring diagram of the device.

FIG. 7 is a schematic elevational view of the probe.
FIG. 8 is a schematic longitudinal cross sectional view of the probe.

FIG. 9 is a cross sectional fragmentary view showing the upper and lower sections of the probe in more detail.

Referring more in detail to the drawing wherein like reference numerals are used to indicate like parts of the drawing, a load is shown schematically and indicated by the numeral 10. It is to be understood that the term "load" is used to indicate any kind of cargo which is being delivered to the ground from an aircraft. It may also indicate a capsule from outer space, a nose cone, the booster component of a capsule or any load where it is desirable to decelerate the final stage of fall and avoid the shock and damage of a free fall landing.

As shown, the load 10 is carried by a support or platform 12. The load support in the initial stages of the descent, is attached to a stabilizer parachute 14 by means of a lead cable 16 and guy cables 18 attached to the load support in any convenient manner. In the present schematic showing, these cables are attached to the corners of the load support 12. A main parachute 20 is stowed in a parachute pack 22. The parachute pack 22 and the main parachute 20 stowed therein, are attached to the load by a cable 24 and to the stabilizer parachute 14 by an auxiliary cable 26. The cable 16 attaches the pilot parachute to the load. A capsule 27 contains a timer 28 and an explosively operated device 29. The timer 28 may be of the aneroid barometer type, controlled by a preset timing device or an altitude governed barometer, or a combination of both. In the present showing the device is a cutter which cuts the cable 16. An example of such a device is shown in applicant's Patent No. 2,742,697.

A probe and cable housing 30 is mounted on the support 12. As shown, the housing 30 is a hollow cylinder having an axially extending, centrally located, usually cylindrical casing 32 which has a central compartment therein for carrying a probe 34.

A detailed vertical cross section of the member 30 is shown in FIG. 6. Before firing, the rocket is housed in a central bore or recess 36 in the member 32. The rocket probe cable 38 is stowed in the annular recess surrounding the casing 32. The cable 38 may be stowed in the cavity in any one of a number of ways. Care must be taken, however, that it is not stowed by winding in successive windings around the casing member 32. If it were so packed, the rocket would be subject to spinning as the cable 38 unwinds. To prevent this condition, the cable is folded in successive upward and downward folds or convolutions (see FIG. 6) continuing around the central housing member 32, so that no twisting of the cable 38 occurs.

The folds of the cable may be arranged in other ways, for example, they may lie in horizontal convolutions directed backward and forward within the annular cavity 38. Under any circumstances, however, the twisting of the cable 38 by winding around the central casing 32 is avoided.

Conductors 56 are carried by a cable connecting the probe to the timer switch 28. (See FIG. 2, and circuit A of the wiring diagram shown in FIG. 6.) A detonating charge 50 communicates with the rocket fuel 52, and is detonated by the closing of the timer switch 28. As above noted, the switch 28 may be exclusively time or altitude controlled, or the control may be a combination of both. When the predetermined time altitude conditions are met, the switch 28 is closed and the rocket fuel 52 is ignited. The rocket probe 34 is propelled downward. Three rocket jets 58 are provided in the present showing, but the invention is not limited to this specific probe body design.

The probe cable 38 is the carrier of electrical conductors 46 which form the electrical circuit indicated at B in FIG. 6. The cable is divided, as shown at 44 and attached to the rear of the probe. The conductors 46 pass through a slot 42 in the casing 32 and pass downward through the rocket fuel in the probe casing, protected by a ceramic, metal, or other refractory tube 48, and ending in a pair of terminal members 49.

A ground contact nose 60 is provided with a sleeve 62, a compression spring 64, and a contact member 66. The sleeve 62 telescopes over the end of the tube 48, and in sliding relation therewith. The spring biasing member 64 biases the nose 60 away from the rocket probe body. When the nose 60 touches ground the bias of the spring 64 is overcome. The sleeve 62 telescopes over the tube 48 and contact is made between the terminals 49 and the contact block 66. The circuit B is thus closed and the cutter 29 is activated.

The cable 16, which forms the connection between the stabilizer parachute 14 and the load support 12 is severed. The load is momentarily released from the buoyancy of the stabilizer parachute but is transferred back to it when the line 26 becomes taut. In this interval of drag between load and stabilizer parachute, the deployment of the main parachute 20 from the pack 22 takes place. (See FIGS. 3 and 4.) During the deployment and opening of the main parachute, the weight of the load severs the pilot parachute 14 from the main parachute 20. This may be accomplished in any expedient manner. A section of the cable 16 may be made to possess a designed weakened characteristic, which causes it to break. The main parachute 20 now opens and the load is carried to the ground at a sufficiently decelerated rate to deliver the cargo undamaged.

While the invention is shown and described in connection with one form for illustrative, rather than restrictive purposes, it is obvious that changes and modifications may be made by those skilled in the art without departing from the scope and spirit of the invention as defined in the accompanying claims.

I claim:

1. A device for effecting damping of free fall of a load delivered to ground from an aircraft comprising a rocket propelled ground probe, a support for said load, rocket propelling means in said probe, a probe housing carried on said support, a cable connecting said probe to said housing and adapted to be stowed within said housing, a parachute pack, a parachute attached to said load for ground delivery support of said load, and adapted to be stowed in said pack, time altitude controlled means for igniting said rocket and propelling said probe downward under rocket propulsion, an electrical circuit, electrical conductors carried in said probe cable, a ground contact element in said probe, a switch in said probe for closing said circuit, said ground contact element closing said switch when ground contact is made, means for deploying said parachute from said parachute pack, said means being rendered operative for deploying said parachute when said circuit is closed.

2. A device for damping landing impact of loads delivered to ground from aircraft in flight comprising a pilot parachute for damping initial free fall of a load, a main parachute carried by said load in stowed condition during the initial stages of the fall, means for connecting said load to said main parachute in load supporting relationship, a probe, rocket propelling means for said probe, a measured length of cable attaching said probe to said load, timed means for igniting said rocket propelling means at a predetermined interval after the load has left the aircraft to propel said probe downwardly, electrical conductors in said cable, a switch inserted in the circuit formed by said conductors, a ground contact member on said probe for closing said switch, means for deploying said main parachute, said last named means being rendered operative by the closing of said switch.

3. A device for damping landing impact of loads delivered to ground by aircraft in flight comprising a pilot parachute for damping initial free fall of a load, a main parachute stowed during the initial fall of the load from the aircraft in a parachute pack, a cable for connecting said pilot parachute to said load, means for connecting said main parachute to said load, means for connecting said pilot parachute to said parachute pack, a probe positioned adjacent said load in the initial stages of fall, rocket propelling means in said probe, a measured length of cable attaching said probe to said load, timed means for igniting said rocket propelling means to propel said probe downwardly, electrical conductors in said cable, a switch in said probe, a ground contact member on said probe for closing said switch, cutting means operated by the closing of said switch for cutting said cable, thereby transferring the weight of the load and causing sufficient drag between said main parachute and said pilot parachute to cause said main parachute to deploy from said parachute pack.

4. In a device for damping landing impact of loads delivered to ground from aircraft in flight, said device having a pilot parachute for damping the initial free fall of the load, a main parachute carried by said load in stowed condition during the initial stages of said fall, an electrical circuit including means for releasing said main parachute from its stowed condition, and means for connecting said load to said main parachute in load supporting relationship; a probe comprising a probe body, rocket fuel carried in said body, means on said probe for igniting said rocket fuel to propel said probe downward from said load, a cable of predetermined length for connecting said probe to said load, conductors carried in said cable and constituting a portion of said electrical circuit, a ground contact operated switch on said probe connected to said conductors for energizing said first named means when the probe contacts the ground.

5. A rocket probe device for decelerating landing of loads delivered by air, said device comprising a pilot parachute for damping initial free fall of said loads, a main parachute maintained in stowed condition in a parachute pack during the initial free fall period, cable connecting means connecting said pilot parachute to said load in load supporting relationship, a second cable connecting means capable of connecting said main parachute to said load in load supporting relationship, a third cable connecting said pilot parachute to said main parachute pack, a rocket propelled and time actuated ground probe means for severing said first-named cable connecting means to jettison said pilot parachute, thereby shifting the weight of said load from said pilot parachute to the third cable and to said main stowed parachute pack, and whereby said main parachute is deployed and rendered load supporting, said severing means being actuated by ground contact of said rocket propelled probe.

6. A device for damping landing impact of loads delivered to ground by aircraft in flight comprising a parachute attached to said load, and stowed within a parachute pack at the beginning of the drop, means for deployment of said parachute from said pack for support of said load at a predetermined distance from the ground, said means comprising an altitude actuated and rocket propelled ground probe.

7. A rocket propelled ground probe device for deploying a parachute in midair for providing support for damping free fall of a descending load and reducing landing impact, said device comprising a parachute carried in stowed condition adjacent said load and connected thereto in load supporting relationship, deploying means for deploying said parachute, a rocket propelled ground probe for triggering said deploying means at a predetermined ground distance.

References Cited in the file of this patent

UNITED STATES PATENTS

| | | |
|---|---|---|
| 1,363,578 | Edwards | Dec. 28, 1920 |
| 1,709,264 | Holt | Apr. 16, 1929 |
| 2,474,125 | Schultz | June 21, 1949 |
| 2,486,403 | Hattan | Nov. 1, 1949 |

FOREIGN PATENTS

| | | |
|---|---|---|
| 168,924 | Great Britain | Sept. 12, 1921 |